Jan. 18, 1972 P. W. SOLOMON 3,636,159
HYDROFORMYLATION PROCESS AND CATALYST
Filed Dec. 19, 1968
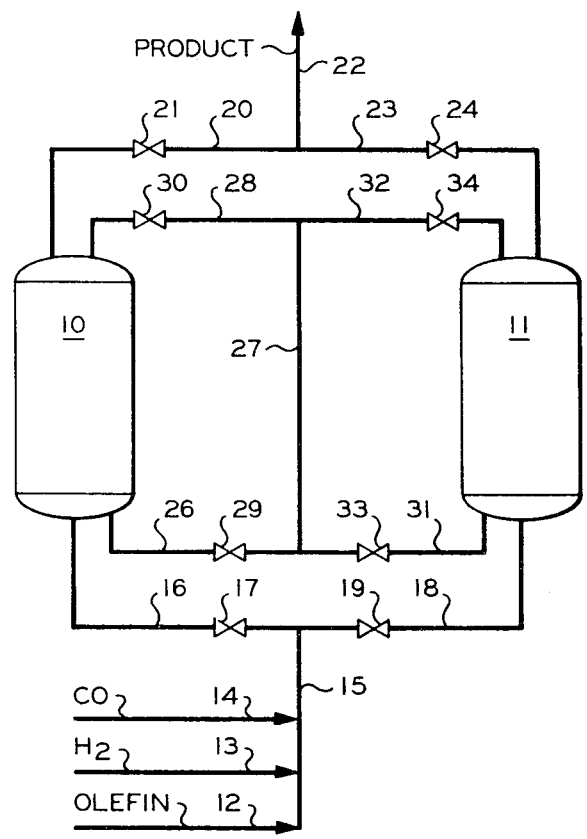
INVENTOR.
P. W. SOLOMON
BY *Young & Quigg*
ATTORNEYS

United States Patent Office 3,636,159
Patented Jan. 18, 1972

3,636,159
HYDROFORMYLATION PROCESS AND CATALYST
Paul W. Solomon, Bartlesville, Okla., assignor to
Phillips Petroleum Company
Filed Dec. 19, 1968, Ser. No. 785,121
Int. Cl. C07c *45/16*
U.S. Cl. 260—604 HF                12 Claims

ABSTRACT OF THE DISCLOSURE

Hydroformylation reactions are carried out in the presence of a catalyst comprising a solid polymer of a pyridine having associated therewith a metal of the group cobalt, rhodium, ruthenium, platinum and palladium. The polymer, which can be formed in part of a polyvinylaromatic compound, is used to remove catalyst residues from hydroformylation reaction effluent streams.

---

It is well known that various olefins can be reacted with carbon monoxide and hydrogen so as to be converted into corresponding aldehydes and/or alcohols. These reactions are often referred to as oxo or hydroformylation reactions. In the past, dicobalt octacarbonyl has commonly been used as a catalyst for carrying out reactions of this type. A typical known reaction is one in which the catalyst comprises dissolved cobalt in a concentration of approximately 2,000 parts per million in the reaction zone. Unfortunately, substantial amounts of the catalyst are dissolved in the reaction products and must eventually be recovered. The recovery of catalyst from the reaction products is a relatively expensive operation and greatly increases the cost of the process. It is also known that reactions of this type can be carried out by use of catalyst systems which comprise a complex of a metal, such as cobalt, carbon monoxide and a nitrogen-containing ligand comprising a substituted pyridine, see U.S. Pat. 3,231,631, for example. Again, catalyst removal is a problem.

In accordance with the present invention, an improved catalyst system is provided for use in oxo reactions. This is accomplished by combining conventional oxo catalysts, such as dicobalt octacarbonyl, with a solid support formed of a nitrogen-containing polymer. By use of a catalyst system of this type, it is possible to maintain the concentration of metal in the reaction zone at a much lower level than has been possible heretofore. This greatly simplifies the removal of catalyst residues from the reaction products. In addition, a system is provided in accordance with this invention for recovering catalyst residues from the reaction products in an oxo process. This is accomplished by passing the reactor effluent through a bed of nitrogen-containing polymer. The polymer serves to remove catalyst residues from reaction products, and in so doing forms a material which can subsequently be used as the catalyst system in an oxo process.

Accordingly, it is an object of this invention to provide improved catalyst systems for use in oxo processes.

Another object is to provide novel methods of converting olefinic materials into alcohols and aldehydes.

A further object is to provide improved procedures for removing catalyst residues from reaction products in oxo processes.

Other objects, advantages and features of the invention should become apparent from the following detailed description.

The accompanying drawing is a schematic representation of apparatus which can be employed to carry out the process of this invention.

The novel catalyst system of this invention is formed by contacting a solid nitrogen-containing polymer with a material which serves to promote the reaction of olefinic materials with carbon monoxide and hydrogen. The materials which can be so employed are cobalt, rhodium, ruthenium, platinum and/or palladium, which are in such a form as to constitute a metal carbonyl under the reaction conditions. In general, cobalt is the preferred metal, and advantageously can be in the form of cobalt hydrocarbonyl or dicobalt octacarbonyl.

The nitrogen-containing polymers employed in the catalyst system of this invention are polymers of vinyl substituted monocyclic pyridines of the formula:

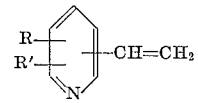

wherein each R and R' is hydrogen or an alkyl group having 1 to 4 carbon atoms. Examples of such pyridines include 2-vinylpyridine, 3-vinylpyridine, 4-vinylpyridine, 2-methyl-5-vinylpyridine, 4-butyl-2-vinylpyirine, 3,5-dimethyl - 2 - vinylpyridine, 3 - ethyl-5-propyl-4-vinylpyridine and the like. Either homopolymers or copolymers of the foregoing materials, alone or in combination with minor amounts of other monomeric materials can be employed. Particularly good results are obtained by use of a copolymer produced by polymerizing at least one of the above vinyl substituted monocyclic pyridines with about 1 to 15 parts by weight, per 100 parts of vinylpyirine, of a polyvinyl aromatic compound. The polyvinyl aromatic compounds so employed can have any one of the following general formulas:

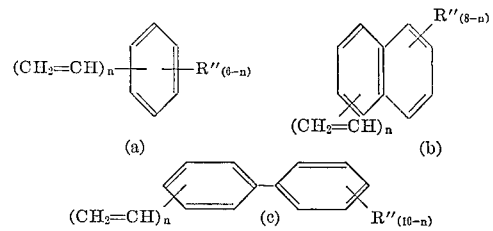

wherein each R″ is hydrogen or an alkyl group containing 1 to 4 carbon atoms with the total of the alkyl substituents containing not more than 12 carbon atoms, and $n$ is 2 or 3. The substituents in the above Formulas (b) and (c) can be on either or both rings. Examples of suitable polyvinyl aromatic compounds which can be employed include divinylbenzene, 1,2,4-trivinyl benzene, 1,3-divinylnaphthalene, 1,8-divinylnaphthalene, 1,3,5-trivinylnaphthalene, 2,4-divinylbiphenyl, 3,5,4′-trivinylbiphenyl, 1,2-divinyl-3,4-dimethylbenzene, 1,5,6-trivinyl-3,7-diethylnaphthalene, 1,3-divinyl-4,5,8-tributylnaphthalene, 2,2′-divinyl-4-ethyl-4′-propylbiphenyl, and the like. The divinyl aromatic hydrocarbons containing up to 26 carbon atoms are preferred, particularly divinylbenzene in either its ortho, meta, or para isomer. Commercial divinylbenzene which is a mixture of isomers is quite satisfactory. One or more of the polyvinyl aromatic compounds can be employed, providing that the total amount of compounds so employed is within the range described.

The vinylpyridines and the polyvinyl aromatic compounds are introduced into a suitable reactor along with a polymerization catalyst. Various catalysts known in in the art for the polymerization of vinylpyridines can be employed. Suitable catalysts for this purpose include peroxy compounds, perchlorates, persulfates, diazo thio ether compounds, azo-bis-alkylnitrile compounds, and the like. Examples of specific catalysts which can be used include hydrogen peroxide, di-tert-butyl peroxide, benzoyl peroxide, perchloric acid, persulfuric acid, cumene hydroperoxide, (dimethylbenzene - diazo-mercapto)naphthalene, azo-bis-isobutyronitrile (AIBN), and the like. Other catalysts which can be employed include free radical precursors which are listed in the Faraday Society Symposium on Free Radicals, London, 1953 and the book Free Radicals by Ingram, Academic Press, Inc., New York, 1958. The amount of catalyst used is generally in the range of 0.01 to 2 parts by weight per 100 parts of total vinylpyridine.

The polymerization reactions are advantageously carried out in the presence of a reaction medium which comprises a mixture of methanol and water. This mixture should contain from 35 to 65 volume percent methanol. When this specific reaction medium is utilized, the resulting polymer is in the form of a fluffy white solid. This solid can be water-washed to recover a white, free-flowing powder comprising small beads of polymer. These polymer beads are particularly useful as a support for forming the catalysts.

The polymerization reaction can take place under a variety of reaction conditions. For example, reaction temperatures in the general range of 25 to 105° C. are suitable. Reaction pressure of 0 to 100 p.s.i.g., or higher, can be employed. Reaction times are usually in the range of 15 minutes to 150 hours. It is generally desirable to carry out the polymerization reaction in an inert atmosphere. This can be accomplished by purging the reactor with an inert gas such as nitrogen, and maintaining a blanket of such a gas within the reactor during the polymerization. The reaction effluent can be water washed to remove traces of catalyst and recover polymer in powder form.

The catalyst system of this invention can be formed by any convenient procedure. For example, cobalt naphthenate, dicobalt octacarbonyl or other hydrocarbon-soluble compound or compounds of cobalt, rhodium, ruthenium, platinum and/or palladium can be dissolved in an aromatic, paraffinic, or cycloparaffinic material or in the olefinic material itself which is to be employed in the oxo reaction. The resulting solution is then placed in contact with the polymer under an atmosphere of carbon monoxide and hydrogen at a temperature in the general range of 250 to 400° F. The mixture can be agitated until equilibrium has been attained between the metal on the polymer and metal in solution. This usually requires from about 10 second to about one hour. However, as discussed in greater detail hereinafter, the catalyst system can actually be formed in the reaction chamber itself. The amount of metal on the polymer support is of the order of 0.2 to 20, preferably 0.5 to 10, millimoles of metal per 5 grams of polymer support.

The oxo reaction is carried out by contacting an olefinic material with carbon monoxide and hydrogen in the presence of the catalyst system of this invention. The reaction is generally carried out at pressures in the range of 600 to 5000 p.s.i.g. of hydrogen and carbon monoxide, with about 1500 to 2500 p.s.i.g. being preferred. The reaction temperature depends to a large degree on the pressure employed as well as the desired reaction product. Temperatures in the range of about 200 to 450° F., preferably 330 to 370° F., are preferred. In general, lower pressures favor production of more branched product and high boilers. Alcohol production increases at higher pressures. The residence time is of the order of 1 minute to 10 hours, preferably 10 minutes to 5 hours.

The process of this invention is applicable to the reaction of any aliphatic, either cyclic or acyclic, compound having at least one ethylenic carbon-to-carbon linkage. The invention is particularly applicable to olefinic hydrocarbons containing from 2 to about 12 carbon atoms. Both conjugated and non-conjugated olefins can be employed. Cyclic compounds, particularly 5 and 6 ring carbon atom hydrocarbons, can be reacted. The process of this invention is also applicable to the reaction of nonhydrocarbons containing ethylenic carbon-to-carbon linkages. In general, the catalyst system of this invention can be employed to advantage in carrying out the various hydroformylation reactions enumerated in U.S. Pat. 3,231,621.

In carrying out the process of this invention, at least 1 mol of carbon monoxide and 2 mols of hydrogen are required for each mol of olefinic material when alcohols are to be produced. In the production of aldehydes, only one mol of hydrogen is required for each mol of olefin. The ratio of hydrogen to carbon monoxide can thus be varied according to the desired reaction products. In general, the mol ratio will be at least 1. In many cases, the rate of reaction as well as the yield of desired product can be increased by increasing the hydrogen to carbon monoxide mol ratio above 1.

The catalyst system of this invention has been found to be quite effective in carrying out oxo reactions with commercially available feed streams containing sulfur compounds, which are considered to be catalyst poisons in conventional oxo reactions. It appears that the polymer portion of the catalyst system may act as a reservoir for the soluble metal, and release additional metal to replace that which may be tied up by the catalyst poisons.

As previously mentioned, the solid polymer employed in preparing the catalyst system of this invention can also be used to advantage to remove catalyst residues from the reaction products. At temperatures below about 300° F., approximately 90 to 95% of soluble cobalt carbonyl is deposited on the polymer base. A system for carrying out the process of this invention, including catalyst residue removal, is illustrated schematically in the accompanying drawing. The apparatus therein illustrated comprises two chambers 10 and 11 which can be any suitable vessels of configurations capable of retaining the solid polymer of the catalyst system of this invention. For example, these chambers can be provided with screens at the two ends to retain the catalyst. It will be assumed that reactor 10 initially contains the complete catalyst system, whereas reactor 11 initially contains only the solid polymer component of the catalyst system. Olefinic feed, hydrogen and carbon monoxide are introduced through respective conduits 12, 13 and 14 which communicate with a common inlet conduit 15. Conduits 12, 13 and 14 can be provided with flow control means, not shown, to regulate the rates of introduction of the feed materials. A conduit 16, having a valve 17 therein, communicates between conduit 15 and a first inlet of reactor 10. A corresponding conduit 18, having a valve 19 therein, communicates between conduit 15 and reactor 11. A conduit 20, having a valve 21 therein, communicates between an outlet of reactor 10 and a common outlet conduit 22. A similar conduit 23, having a valve 24 therein, communicates between reactor 11 and conduit 22. A second inlet of reactor 10 is connected to a second outlet thereof by conduits 26, 27 and 28. Valves 29 and 30 are disposed in respective conduits 26 and 28. Similarly, a second inlet of reactor 11 is connected to a second outlet thereof by conduits 31, 27 and 32. Valves 33 and 34 are disposed in respective conduits 31 and 32.

At the beginning of the reaction cycle, valves 17, 30, 33 and 24 are open and valves 19, 34, 29 and 21 are closed. Thus, the feed materials flow from conduit 15 through conduit 16, reactor 10, conduits 28, 27 and 31, reactor 11, and conduit 23 to outlet conduit 22. The oxo reaction takes place in reactor 10, and the effluent stream passes through reactor 11. The polymer contained within chamber 11 serves to remove catalyst residues from the reaction products. Any cobalt, or other metal catalysts, which may be entrained in the reactor effluent, is deposited on the solid polymer in reactor 11 and is thereby removed from the effluent stream. This operation continues until the polymer in reactor 11 is no longer capable of removing the desired quantity of catalyst residue and/or until the catalyst in reactor 10 has lost its desired activity because of the removal of metal with the reactor effluent stream. At this time, the system can be reversed so that chamber 11 serves as the reaction chamber and chamber 10 serves as the catalyst scavenging bed. This is accomplished by opening valves 19, 34, 29 and 21 and closing valves 17, 30, 33 and 24. In this procedure, the catalyst system is effectively formed in-situ in the vessel which serves to remove catalyst residues from the reaction products. The desired product or products can be separated from other materials in the reactor effluent by fractionation or any other convenient procedure.

In the procedure illustrated in the drawing, the vessel serving as the reactor is maintained in the temperature range of 300 to 450° F., with the pressure being in the range of 600 to 5000 p.s.i.g. The scavenging bed vessel is maintained in the temperature range of 50 to 250° F., with the pressure being in the range of 600 to 5000 p.s.i.g. Suitable heat exchangers and compressors, not shown, can be associated with the illustrated apparatus to maintain these conditions.

The catalyst residue removal system can also be used to treat effluent streams from conventional hydroformylation reactions employing any of the metals listed above as catalysts.

The following examples demonstrate various features of this invention:

EXAMPLE I

A number of runs were conducted to demonstrate the use of several different polymers in catalyst systems of this invention. In these runs, 75 milliliters of hexene-2, 5 grams of polymer and 0.5 gram of $Co_2(CO)_8$ were charged to a stirred autoclave. The polymers were prepared by polymerizing mixtures of the vinylpyridines and divinylbenzene in the noted weight ratios. The resulting solid polymer, in the form of finely divided particles, was employed. After charging, the autoclave was purged three times with an equimolar mixture of hydrogen and carbon monoxide at pressures in the range of 300 to 400 p.s.i. The autoclave was then pressured to 2200 p.s.i. with this gas blend, and thereafter heated to the temperatures noted for the times noted. Two runs were carried out with each catalyst system, and are designated as runs 1 and 2 in the following Table I. The first run was carried out in the manner described. At the completion of the first run, the liquid product was decanted and a second run was carried out by charging an additional 75 milliliters of hexene-2, but without additional $Co_2(CO)_8$. The following results were obtained:

It can be seen from the foregoing table that in all of the runs substantial amounts of aldehydes and lesser amounts of alcohols were formed. It can also be seen that the catalyst used in the second runs, without addition of further quantities of $Co_2(CO)_8$, gave substantial conversions. The amount of cobalt in the liquid product was quite low compared to conventional prior art systems, which often have as much as 2,000 p.p.m. cobalt present in the product.

EXAMPLE II

A number of runs were conducted under the same general conditions as set forth in Example I to demonstrate that the catalyst could be employed to conduct a plurality of reactions without being renewed or regenerated. The polymer was prepared by polymerizing 2-vinylpyridine and divinylbenzene in a 96:4 weight ratio. At the completion of the first run, the autoclave was cooled and the liquid product was decanted from the solid catalyst as thoroughly as possible. An additional charge of 75 milliliters of hexene-2 was added and the reaction repeated. This same procedure was repeated for each additional run. The following results were obtained:

TABLE II

| | | | | Mole percent selectivity of 2-hexene to— | | | | | | | | Cobalt in liquid product, p.p.m. |
|---|---|---|---|---|---|---|---|---|---|---|---|---|
| | Temp., °F. | Reaction time, min. | 2-hexene conversion, percent | n-Hexane | Branched $C_7$ aldehydes | n-$C_7$ aldehyde | $C_7$ formates | Branched $C_7$ alcohols | n-$C_7$ alcohol | Weight percent high boiler | Branched/normal product ratio | |
| Run: | | | | | | | | | | | | |
| 1 | 250-320 | 100 | 94 | 2 | 36 | 52 | 0.5 | 1 | 2 | 6 | 41/59 | 28 |
| 2 | 260-340 | 107 | 84 | 3 | 37 | 51 | 0.1 | 1½ | 2 | 5 | 52/58 | 33 |
| 3 | 300-25 | 110 | 89 | 3 | 38 | 49 | 0.1 | 1½ | 2 | 6 | 43/57 | 25 |
| 4 | 270-325 | 75 | 84 | 4 | 38 | 44 | Trace | 2 | 3 | 8 | 46/54 | 20 |
| 5 | 325 | 30 | 74 | 4 | 39 | 41 | ...do | 3 | 3.5 | 7 | 49/51 | 19 |
| 6 | 325-35 | 57 | 75 | 2 | 40 | 52 | ...do | 1 | 1.5 | 3 | 44/56 | 33 |
| 7 | 330 | 58 | 77 | 3 | 40 | 51 | ...do | ½ | 1 | 4 | 43/57 | 18 |
| 8 | 340 | 53 | 79 | 2 | 40 | 50 | ...do | 1½ | 2 | 4 | 44/56 | 39 |
| 9 | 300-40 | 38 | 79 | 4 | 41 | 47 | ...do | 2 | 2 | 4 | 47/53 | 38 |
| 10 | 320-40 | 64 | 82 | 3 | 40 | 50 | ...do | 1 | 1.5 | 4 | 44/56 | 13 |
| 11 | 325-30 | 46 | 82 | 4 | 40 | 48 | ...do | 1½ | 1.5 | 5 | 45/55 | 6 |
| 12 | 315-50 | 57 | 87 | 4 | 38 | 48 | ...do | 1½ | 2 | 6 | 44/56 | 7 |
| 13 | 320-50 | 76 | 80 | 3 | 39 | 49 | ...do | 1 | 2 | 5 | 44/56 | 7 |

It can be seen that the catalyst system remained active throughout the 13 runs with small variation in products produced. Although the cobalt remaining in the liquid products decreased to quite low levels in the last few runs, this did not have any appreciable effect on the reaction kinetics.

EXAMPLE III

Runs were conducted to illustrate the operation of a dual bed catalyst and scavenger system. A 500 milliliter stirred autoclave was employed as the initial reaction chamber and a 300 milliliter stirred autoclave was employed as the initial scavenging bed. Hexene-2 was reacted initially in the 500 milliliter autoclave. The resulting product was transferred to the 300 milliliter autoclave where it was stirred with a bed of solid polymer. After 25 runs of this type, the cycle was reversed and seven runs (26-32) were made with the 300 milliliter autoclave being the reactor and the 500 milliliter autoclave being

TABLE I

| Pyridine monomer | Monomer/divinyl-benzene, wt. ratio | Run | Temp., °F. | Time, min. | 2-hexene conv., percent | Mole percent selectivity of 2-hexene to — | | | | | | Wt. percent high boiler | Branched/normal product ratio | Cobalt (p.p.m.) in liquid product |
|---|---|---|---|---|---|---|---|---|---|---|---|---|---|---|
| | | | | | | n-hexane | Branched $C_7$ aldehydes | n-$C_7$ aldehyde | $C_7$ formates | Branched $C_7$ alcohols | n-$C_7$ alcohol | | | |
| 2-vinyl | 98/2 | 1 | 320-50 | 120 | 77 | 2.5 | 38 | 45 | 0.4 | 2.5 | 3 | 9 | 45/55 | 82 |
| | | 2 | 320-50 | 52 | 66 | 2 | 42 | 48 | Trace | 1 | 2 | 5 | 47/53 | 30 |
| | 96/4 | 1 | 300-35 | 75 | 75 | 2.5 | 41 | 51 | 0.4 | 1 | 2 | 2.5 | 44/56 | 40 |
| | | 2 | 300-40 | 80 | 66 | 4 | 39 | 44 | 0.2 | 3 | 4 | 5.5 | 46/54 | 50 |
| | 92/8 | 1 | 300-20 | 202 | 77 | 7 | 36 | 36 | 0.4 | 4 | 4 | 12.5 | 50/50 | 400 |
| | | 2 | 300-20 | 93 | 59 | 3 | 38 | 50 | 0.5 | 1.5 | 2 | 5 | 43/57 | 91 |
| 3-vinyl | 96/4 | 1 | 210-20 | 50 | 97 | 1.5 | 37 | 51 | 0.7 | 1 | 1 | 9 | 42/58 | 930 |
| | | 2 | 250-395 | 165 | 64 | 3 | 38 | 46 | Trace | 1 | 1 | 10 | 45/55 | 20 |
| 4-vinyl | 96/4 | 1 | 320-55 | 25 | 85 | 7.5 | 34 | 32 | 0.5 | 6.5 | 7.5 | 13 | 51/49 | 68 |
| | | 2 | 350-65 | 130 | 64 | 3.5 | 39 | 27 | Trace | 2 | 3 | 26 | 58/42 | 5 |
| 2-methyl-5-vinyl | 95/5 | 1 | 330 | 28 | 87 | 10 | 30 | 29 | 0.3 | 8 | 9 | 14 | 50/50 | 50 |
| | | 2 | 300-30 | 160 | 71 | 2 | 38 | 44 | 0.2 | 2 | 4.5 | 9 | 46/54 | 30 | the scavenging bed. Initially, 10 grams of polymer (96/4 2-vinylpyridine/divinylbenzene) and 1 gram of $Co_2(CO)_8$ were placed in the 500 milliliter autoclave which was then pressured to 2200 p.s.i. with an equimolar mixture of hydrogen and carbon monoxide. In each run, 100 milliliters of hexene-2 was employed as the feed. The following results were obtained:

parts of vinylpyridine of at least one polyvinyl aromatic compound of the formula

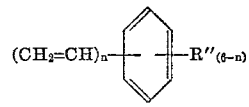

TABLE III

| Run Number: | Reaction | | Scavenging | | Cobalt, p.p.m. | | Conversion, percent |
|---|---|---|---|---|---|---|---|
| | Time, min. | Temp., °F. | Time, min. | Temp., °F. | Before | After | |
| 1 | | Up to 350 | 15 | 220 | 105 | 16 | 97 |
| 2 | 30 | 360 | 15 | 260 | 87 | 10 | 81 |
| 3 | 30 | 345 | 15 | 240 | 102 | 11 | 64 |
| 4 | 30 | 355 | 30 | 245 | 83 | 8 | 71 |
| 5 | 30 | 350 | 85 | 250 | 84 | 7 | 67 |
| 6 | 60–85 | 345 | 15 | 250 | 64 | 8 | 85 |
| 7 | 30 | 355 | 15 | 260 | 65 | 8 | 72 |
| 8 | 30 | 350 | 30 | 300 | 70 | 12 | 63 |
| 9 | 30 | 355 | 30 | 300 | 65 | 13 | 72 |
| 10 | 30 | 350 | 105 | 300 | 65 | 12 | 65 |
| 11 | 105 | 350 | 30 | 275 | 40 | 8 | 87 |
| 12 | 30 | 350 | 30 | 275 | 61 | 8 | 60 |
| 13 | 30 | 352 | 30 | 250 | 44 | ¹2 | 58 |
| 14 | 30 | 355 | 80 | 250 | 44 | ¹2 | 57 |
| 15 | 75 | 335–390 | 30 | 250 | 44 | ¹2 | 80 |
| 16 | 30 | 355 | 30 | 250 | 44 | ¹2 | 65 |
| 17 | 30 | 355 | | | 44 | ¹2 | 54 |
| 18 | 30 | 352 | 30 | 250 | 44 | ¹2 | 52 |
| 19 | 30 | 352 | 30 | 250 | 44 | ¹2 | 47 |
| 20 | 30 | 355 | 30 | 250 | 41 | ¹3.5 | 53 |
| 21 | 30 | 357 | 30 | 250 | 41 | ¹3.5 | 50 |
| 22 | 30 | 355 | 30 | 250 | 41 | ¹3.5 | 48 |
| 23 | 30 | 360 | 30 | 250 | 41 | ¹3.5 | 51 |
| 24 | 30 | 352 | 30 | 250 | 41 | ¹3.5 | 44 |
| 25 | 30 | 358 | | | | 3.2 | 41 |
| 26 | 30 | 355 | 30 | 250 | 39.3 | 5.1 | 43 |
| 27 | 30 | 355 | 85 | 250 | 32.9 | 4.5 | 48 |
| 28 | 85 | 355 | 0 | | 24.9 | | 65 |
| 29 | 30 | 355 | 30 | 250 | 34.6 | 2.9 | 45 |
| 30 | 30 | 355 | 30 | 250 | 30.1 | 4.0 | 43 |
| 31 | 30 | 355 | 30 | 250 | 31.5 | 3.9 | 46 |
| 32 | 30 | 355 | 30 | 250 | 30.6 | 3.4 | 42 |

¹ Average.

The foregoing runs clearly demonstrate the feasibility of the dual catalyst and scavenging bed system of this invention. The scavenging bed was quite effective in removing cobalt from the product. Also, substantial conversion was obtained after the beds were reversed.

What is claimed is:

1. In a hydroformylation process in which an olefinic material is reacted with carbon monoxide and hydrogen under hydroformylation conditions; the improvement which comprises carrying out the reaction in the presence of a catalyst comprising a solid nitrogen-containing polymer having associated therewith at least one metal carbonyl of a metal of the group consisting of cobalt, rhodium, ruthenium, platinum and palladium, said metal carbonyl being present in an amount in the range of 0.2 to 20 millimoles of metal per 5 grams of polymer support, said solid polymer having been prepared by polymerizing monomer consisting essentially of one or more pyridines of the formula

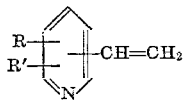

wherein each R and R' is hydrogen or an alkyl group having 1 to 4 carbon atoms.

2. The process of claim 1 wherein said metal is cobalt.

3. The process of claim 1 wherein said polymer is a polymer prepared by polymerizing said pyridine in the presence of from about 1 to 15 parts by weight per 100 parts of vinylpyridine of at least one polyvinyl aromatic compound of the formula or

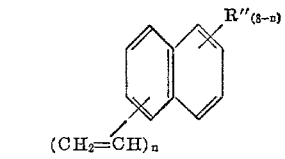

wherein each R" is hydrogen or an alkyl group having 1 to 4 carbon atoms, with the total of the alkyl constituents containing not more than 12 carbon atoms, and $n$ is 2 or 3.

4. The process of claim 3 wherein said polyvinyl aromatic compound is divinylbenzene.

5. The process of claim 1 wherein said reaction is carried out by passing the olefinic material, carbon monoxide and hydrogen through a first zone containing said catalyst, and further comprising the step of passing the effluent from said first zone through a second zone which contains a solid nitrogen-containing polymer of at least one pyridine of the formula

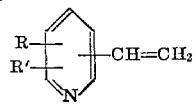

wherein each R and R' is hydrogen or an alkyl group having 1 to 4 carbon atoms.

6. The process of claim 5 wherein the passage of materials through said first and second zones is discontinued after the activity of the catalyst in the first zone has fallen to a preselected level, and thereafter olefinic material, carbon monoxide and hydrogen are passed through said second zone and the effluent therefrom is passed through said first zone.

7. The process of claim 1 wherein the reaction is carried out in the pressure range of 600 to 5,000 p.s.i.g., in the temperature range of 200 to 450° F., and with a mol ratio of hydrogen to carbon monoxide of at least 1.

8. In a hydroformylation process in which an olefinic material is reacted in a first zone with carbon monoxide and hydrogen under hydroformylation conditions in the presence of a catalyst containing at least one metal carbonyl of a metal selected from the group consisting of cobalt, rhodium, ruthenium, platinum and palladium, the method of recovering catalyst residues which comprises passing the effluent from said first zone through a second zone which contains a solid nitrogen containing polymer, said polymer having been prepared by polymerizing monomer consisting essentially of one one or more pyridines of the formula

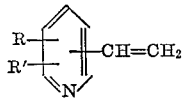

wherein each R and R' is hydrogen or an alkyl group having 1 to 4 carbon atoms.

9. The process of claim 8 wherein said polymer is prepared by polymerizing said pyridine in the presence of from about 1 to 15 parts by weight per 100 parts of vinylpyridine of at least one polyvinyl aromatic compound of the formula

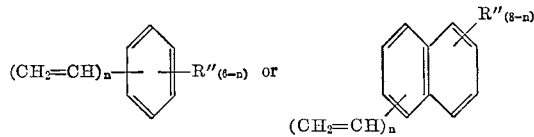

or

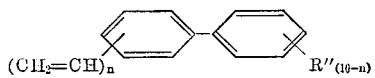

wherein each R'' is hydrogen or an alkyl group having 1 to 4 carbon atoms, with the total of the alkyl constituents containing not more than 12 carbon atoms, and $n$ is 2 or 3.

10. A catalyst useful in carrying out hydroformylation reactions comprising a solid nitrogen-containing polymer having associated therewith at least one metal carbonyl of a metal of the group consisting of cobalt, rhodium, ruthenium, platinum and palladium, said metal carbonyl being present in an amount in the range of 0.2 to 20 millimoles of metal per 5 grams of polymer support, said solid polymer having been prepared by polymerizing monomer consisting essentially of one or more pyridines of the formula

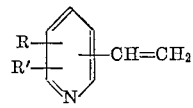

wherein each R and R' is hydrogen or an alkyl group having 1 to 4 carbon atoms.

11. The catalyst of claim 10 wherein the polymer is a polymer prepared by polymerizing said pyridine in the presence of from about 1 to 15 parts by weight per 100 parts of vinylpyridine of at least one polyvinyl aromatic compound of the formula

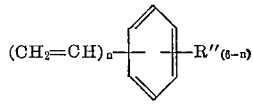

or

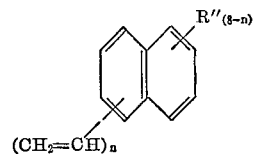

or

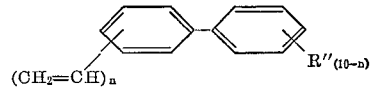

wherein each R'' is hydrogen or an alkyl group having 1 to 4 carbon atoms, with the total of the alkyl constituents containing not more than 12 carbon atoms, and $n$ is 2 or 3.

12. The catalyst of claim 11 wherein said polyvinyl compound is divinylbenzene and said metal is cobalt.

References Cited

UNITED STATES PATENTS

| | | | |
|---|---|---|---|
| 3,352,924 | 11/1967 | Gladrow | 260—604 |
| 3,231,621 | 1/1966 | Slaugh | 260—604 |
| 2,743,298 | 3/1956 | Busk | 260—604 |
| 2,820,058 | 1/1958 | Hasek | 260—604 |
| 2,956,994 | 10/1960 | Peterlein | 260—94.9 |
| 3,419,900 | 12/1968 | Elmore | 136—86 |
| 3,428,514 | 2/1969 | Greer | 161—5 |
| 3,200,007 | 8/1965 | Flowers | 117—138.8 |
| 3,228,882 | 1/1966 | Harle | 252—62.5 |

DANIEL E. WYMAN, Primary Examiner

P. M. FRENCH, Assistant Examiner

U.S. Cl. X.R.

260—598, 632 HF; 252—430, 431